Dec. 31, 1968  D. C. RIDEOUT  3,418,896

REFLECTIVE MARKERS AND REFLECTIVE ELEMENTS THEREFOR

Filed Feb. 3, 1967

INVENTOR
Donald C. Rideout

BY  Karl W. Flocks

ATTORNEY

United States Patent Office 3,418,896
Patented Dec. 31, 1968

3,418,896
REFLECTIVE MARKERS AND REFLECTIVE
ELEMENTS THEREFOR
Donald C. Rideout, Huntingdon, Pa., assignor to Prismo Safety Corporation, Huntingdon, Pa., a corporation of Pennsylvania
Filed Feb. 3, 1967, Ser. No. 613,878
10 Claims. (Cl. 94—1.5)

ABSTRACT OF THE DISCLOSURE

The invention relates to reflective elements which are flat on their upper and lower surfaces and which have vertical side walls covered by a plurality of small glass spheres partially embedded in the vertical side walls, the width of the flat surfaces being at least twice the thickness of the elements and the thickness being in the order of 1/8–1/2" and the width not exceeding 1". The reflective elements can be incorporated into reflective markers for improved night-time retroreflectivity especially in rainy weather. The elements can be incorporated into a hot sprayed liquid binder which is solvent-free.

---

This invention relates to reflective markers, and more particularly to reflective markers and reflective elements for use therein and the method of making said markers which markers give improved reflectivity during rainy weather.

Most reflective markers, such as lane lines on highways are made by dropping small glass beads onto the line while it is still tracky so that the glass beads become partially embedded therein after the line has cured or dried. Such markers are relatively inexpensive and give good night-time reflection.

A disadvantage of this type of marker, however, is the loss of reflectivity at night in rain. A layer of water which collects over the marker causes the glass beads to lose their reflectivity and the marker is not sufficiently visible at night.

Other reflective markers especially suited for reflectivity in rainy weather have been proposed, however, such markers have many disadvantages. The markers heretofore proposed are relatively large and are applied by spiking, gluing, bolting, heating to softness, heating the road surface to softness, or molding in place. Further, such markers are of special shapes having contours which require that they be molded, cast or mechanically built up. Thus, the cost per unit is relatively high and the cost of application is also high. Further, the markers after application are relatively permanent, and after they have lost their reflective characteristics, they are difficult to remove for replacement. Further, the markers are applied at intervals which results in brilliant spots of reflected light at intervals, which is not as acceptable as more continuous lines of light as are obtained when glass beads are dropped onto a painted line.

It is accordingly an object of the present invention to provide a novel type of marker which combines the advantages of the prior known markers yet eliminates their disadvantages.

Another object of the present invention is to provide a novel type of marker which gives an improved daylight appearance and good reflectivity at night even in the rain.

A still further object of the present invention is to provide a novel reflective element which can be incorporated into reflective markers to give good reflectivity to the marker at night even in the rain.

Another object of the invention is to provide a novel reflective element which can be applied automatically and simply onto a continuous tacky line.

Other objects and the nature and advantages of the invention will be apparent from the following description taken in conjunction with the accompanying drawings, wherein.

Figure 1:
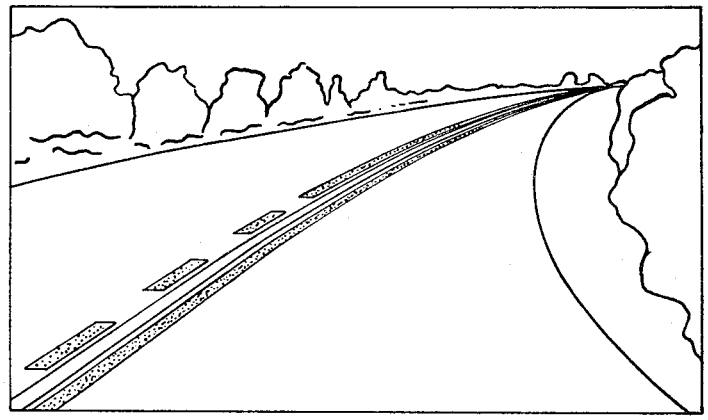
FIG. 1 is a view in perspective of a roadway normally bearing vehicular traffic having lane lines applied thereto in accordance with this invention.
Figure 2:
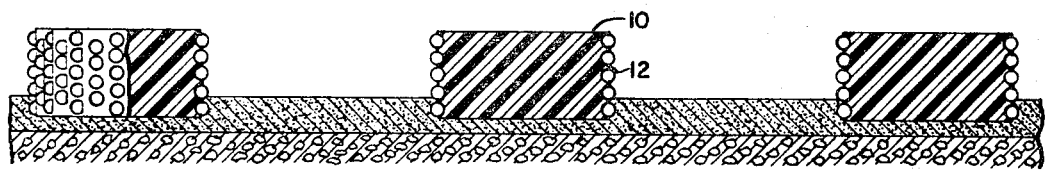
FIG. 2 is a cross sectional view through a lane line in accordance with this invention.
Figure 3:
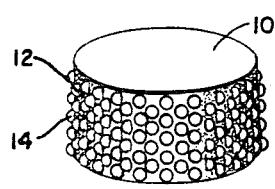
FIG. 3 is a perspective view of a reflective element in accordance with the present invention.

The above objects have been accomplished by the present invention wherein use is made of a reflective element having a flat upper and lower surface with vertical side walls coated with small reflective glass spheres which are partially embedded therein substantially covering the entire periphery of the vertical side walls, the upper flat surface being free of the glass spheres. These reflective elements can be partially embedded in binder material to form reflective markers.

The reflective elements 10 are relatively flat on their top and bottom surfaces and may be of any suitable cross section, preferably round, square, triangular or octagonal as shown in FIGS. 3, and 6–8. The top and bottom surfaces need not be smooth, however. The reflective elements 10 may be made of plastic material such as ceramics or synthetic resins such as polyesters, epoxies, polyurethanes, and other thermosetting resins as well as thermoplastic resins such as acrylic and methacrylic resins, alkyd resins, cellulose nitrate resins, ethyl cellulose resins, vinyl resins, casein and other synthetic or natural resins. The plastic material is preferably pigmented to correspond to the color of the marker it is used with. The outer vertical surfaces 12 are coated with high index glass spheres 14 preferably having an index of refraction of at least 1.9. The size of the spheres may be from 1/2–50 mils in diameter although the preferred range is 3–10 mils. The glass spheres can preferably be partially embedded into the plastic material before it has hardened. However, the glass spheres can also be embedded into a thin coating of plastic material while still tacky which coating has been applied onto the outer vertical surfaces of the elements.

The reflective elements may be manufactured quite inexpensively by extruding or otherwise molding the plastic material in the shape of a rod and applying the glass spheres onto the outer surfaces thereof before the material has hardened, so that the spheres become partially embedded therein. The rod can then be cut or chopped into the desired thickness. The rod can, of course, be molded or extruded into any desired cross section by substituting the desired mold or extrusion die.

The size of the elements can be varied as desired from approximately 1/4"–4" in diameter with a thickness of approximately 1/8"–1/2". Preferably the elements are relatively small, the only requirement being that they have a thickness greater than the thickness of the binder layer so that when applied, a portion of the reflective vertical surfaces will extend above the binder layer. It is preferred, so as to obtain a relatively continuous line of light, that the elements have a width of not exceeding 1", however, widths of 3/8"–5/8" are preferred. The width of the element should be at least twice the thickness of the element, so that it will tend to remain on its larger flat surfaces upon application to the tacky binder layer, as well as to render additional stability to the structure.

When elements having diameters in excess of 1″ are used, the elements require mechanical placement on the binder.

In use, the reflective elements are dropped onto a tacky binder layer with one of the flat sides down. When the marker has cured, the reflective element is partially embedded therein and firmly retained. The exposed vertical walls of the elements extending above the binder layer contain the glass spheres which act as retroreflective spheres to reflect back the headlights of approaching vehicles. Since the glass spheres are on a vertical surface, any rain water tends to run down off of the spheres, and does not accumulate thereon. The top flat surface having no spheres embedded therein gives an improved daylight appearance. Further, the use of these elements eliminates the need for glass spheres directly embedded in the traffic line thereby also giving improved daylight appearance.

The preferred traffic paint or binder to be used with these reflective elements is a pigmented thermoplastic type of traffic paint relatively free of solvent which sets almost immediately and thus has no solvent trapped under the elements. Other types of solvent free, chemically curing two component systems are also quite satisfactory as the traffic paint. If lacquers and oxidizing resin based paints are to be used, the reflective elements can be made porous or provided with holes for the escape of solvent and/or to provide oxygen for curing the paint.

Examples of pigmented traffic paints which can be used in the present invention in which to embed the reflective elements are given in U.S. Patents 3,136,733; 3,046,851; 3,036,928; 3,011,412; 2,983,202; 2,897,733; 2,574,971 and 2,268,537. These are merely examples of traffic paints and the invention is not limited to these compositions, since any traffic paint can be used which meets the specifications required by the various states and municipalities.

Figure 4:
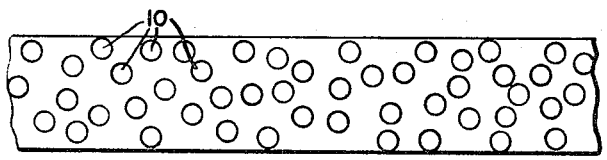
FIGS. 4 and 5 are diagrammatic examples of placement of the reflective elements in the line.
Figure 5:
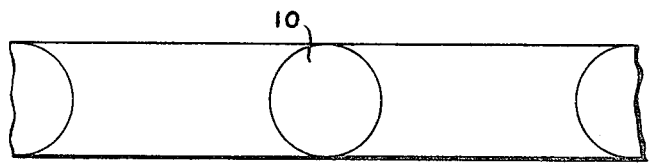
Figure 6:
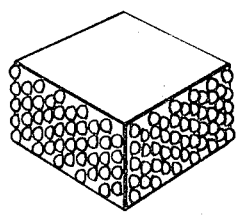
FIGS. 6–8 are perspective views of modified forms of reflective elements.
Figure 7:
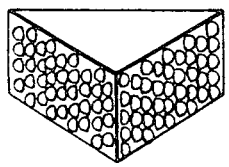
Figure 8:
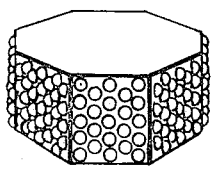

The reflective elements can be dispensed from a dispenser to yield random patterns of application as shown in FIG. 4, or, if desired, the elements can be applied in a predetermined pattern such as that shown in FIG. 5.

When reflective elements having diameters approximately the width of the line are applied, the reflected light will appear to be a continuous line having a length equal to the diameter of the element.

There are many advantages to the present invention. The reflective elements are relatively inexpensive and easily manufactured. Being flat on top, the traffic will ride over the flat portion and will not contact the glass spheres. The markers in accordance with this invention will have better daylight appearance and excellent nighttime reflectivity even in rainy weather. The retroreflection is better than from the conventional marker with glass spheres since the glass spheres in the present markers reflect back light at angles close to perpendicular.

The markers containing the reflective elements in accordance with this invention are adapted to wear evenly due to traffic abrasion so that the elements will wear off by the time their reflectivity has disappeared, and a new marker can then be applied without the necessity of manual removal of the reflective elements as presently required with prior types of known reflective devices.

The markers according to the present invention notify drivers by rumbles or bumps, that a car wheel is beginning to cross into another lane, while at the same time not presenting obstructions or skid-promoting shapes on the road.

The glass spheres 14 which are partially embedded in the vertical walls of the reflective elements may be reflectively coated on their underneath sides. These elements can be simply made by partially embedding reflectively coated glass spheres into the plastic material followed by removal of the exposed reflective coating from the spheres by acid treatment, abrasion or the like. When yellow traffic lines are contemplated, for example, the binder and the elements are pigmented to obtain the desired yellow coloring and the glass spheres are modified to reflect a yellow coloration, such as by use of amber glass, or an overcoating with a transparent yellow material.

The plastic material from which the reflective elements are made may include other materials such as pigments and fillers, catalysts, accelerators, solvents and and the like as necessary.

When polyester resin compositions are used as the plastic material for the elements, they comprise an unsaturated polyester resin and monomeric polymerizable material that does not give off volatile matter during curing.

Ployester resins are a class of resins, which is well known to those skilled in the art. In general, polyester resins are unsaturated alkyd resins formed by the reaction of one or more dicarboxylic acid components and one or more polyhydric alcohols. Illustrative of the dicarboxylic acid components are the saturated components phthalic anhydride and adipic and azelaic acids, and the unsaturated components fumaric acid and maleic acid. Illustrative of the dihydric alcohols most commonly used are glycols of ethylene, propylene, 1,3- and 2,3-butylene, diethylene and dipropylene. An unsaturated monohydric alcohol, such as allyl alcohol, may be used in the place of part of the polyhydric alcohol. One or more of the acid components or polyhydric alcohols should contain a reactive double or ethylene linkage. It is essential that one of the components of the polyester resin contain an unsaturated ethylenic linkage. The polyester reaction products are mixed with a nonvolatile unsaturated monomeric cross-linking agent for the polyester resin. Illustrative of the monomeric agents are the unsaturated hydrocarbons, such as styrene, vinyl toluene, vinyl acetate, methyl methacrylate, alpha and para methyl styrene, divinyl benzene, ethyl acrylate, acrylonitrile, diallyl esters, cyclopentadiene, triallyl cyanurate, and many others. The monomeric agent serves to make the polyester resin more fluid and also to cross-link the resin at the time of curing to produce a cross-linked or three-dimensional polyester resin, which is thermosetting in character. The monomeric agent is of a nature that it is consumed during the curing of the resin without forming volatile materials.

The properties of the polyester resin compositions can be varied through the use of various dibasic acids, different glycols, and different monomers, each varying ratio to the others, permitting preparation of end products with almost any desired properties.

Suitable catalysts which are added to the formulation to cure the polyester resin composition may be selected from a large number of oxidizing catalysts such as benzoyl peroxide, di-t-butyl peroxide, 2,4-dichlorobenzoyl peroxide, methyl ethyl ketone peroxide, cyclohexane peroxide, cumene hydroperoxide, bis(parabromobenzoyl)peroxide, bis(phthalyl)peroxide, bis(parachlorobenzoyl)peroxide, bis(succinyl)peroxide, acetyl benzoyl peroxide, bis(chloroacetyl)peroxide, bis(acetyl)peroxide, tertiary-butyl hydroperoxide, bis(dichlorobenzoyl)peroxide, and 2,2-bis (tertiarybutylperoxy)butane, with which those skilled in the art are familiar. For rapidly curing polyester compositions, the catalyst at least in part is benzoyl peroxide.

Accelerators for the polyester composition may be added to impart glossiness, to minimize stickiness of the material and primarily to decrease the time necessary for gelation or cure of the resin at room temperature.

Illustrative of the accelerators are the cobalt, manganese, vanadium, calcium and iron soaps of organic acids, such as the naphthenates, dimethylaniline, and mixtures of dimethylaniline with ethylene diamine, diethylene triamine, triethylene tetramine, trimethyl aminoethyl phenol, and the other primary, secondary and tertiary amines.

The epoxy resins employed in accordance with the present invention give particularly good results and are commonly referred to as polyglycidyl ethers of polyhydric alcohols and glycidyl ethers of bisphenols, characterized by the following general formula:

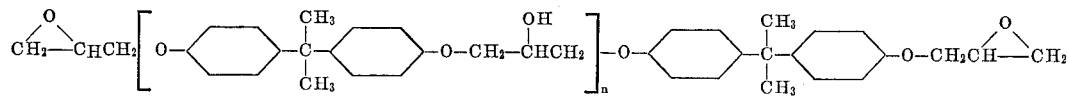

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl aminomethyl phenol, tri(dimethyl aminomethyl)phenol, diaminodiphenyl sulfone, metaphenylene diamine, and diethyl aminopropylamine, acid anhydrides, organic sulfonic acids, dibasic acids and resins, such as polyamides, are typical curing agents.

When an epoxy resin is used, a heat sensitive catalyst may be used which yields a composition that is stable at room temperature and which cures when heated. Such a catalyst is a boron fluoride amine complex.

Good results are also obtained using polyurethane resins. Polyurethane resins are the result of reactions between hydroxyl groups and polyisocyanates. Examples are Multron and Mondur resins manufactured by Mobay Chemical, although several other companies also manufacture such resins. These resins are formulated from polyesters, or other polyols and diisocyanatic or diisocyanate adducts.

Pigment may be added to the plastic material to impart reflection to the composition as well as color and opacity. To produce a white reflecting composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored compositions are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with varium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass cullet, and other natural or manufactured granular materials.

Following are specific examples of formulations which may be used as the plastic material for the reflective elements:

*Example I*

| | Parts by wt. |
|---|---|
| Polyester resin composition | 100 |
| Titanox RA | 30 |
| Benzoyl peroxide | 5 |

The material was extruded in a flowable condition in the form of a round rod ½″ in diameter. Glass spheres of 3–10 mils diameter, index of refraction of 1.92 were brought into contact with the surface of the rod while it was still in a slightly adhesive condition. After the rod had solidified it was cut into disks having a thickness of ¼″.

*Example II*

| | Parts by wt. |
|---|---|
| Epoxy resin (Epotuf 6140) | 800 |
| Phenyl glycidyl ether | 150 |
| Titanium dioxide | 200 |
| Asbestine | 400 |
| Boron trifluoride amine complex | 5 |

In this formulation, the rod is solidified by heat. The phenyl glycidyl ether acts as a diluent. The boron trifluoride amine complex acts as a catalyst which may be mixed with the other ingredients to give a system which is stable at room temperatures. The system cures at temperatures of approximately 300° F.

The following is a specific example of a method of making a reflective traffic line according to the present invention. A continuous line of pigmented binder material is sprayed onto a roadway to yield a 4″ wide stripe having a thickness of approximately 1⁄16″. The binder material is a thermoplastic alkyd resin properly pigmented and containing driers but solvent free. It is applied by heating prior to application to approximately 375° F. and sprayed by a heat jacketed spray gun. Immediately thereafter the reflective elements which have a width of ½″ and a thickness of 3⁄16″ are applied at random from a flat bottomed chute onto the still tacky binder layer with their flat sides down. Upon cooling, the binder solidifies immediately and firmly retains the elements in position so that traffic can be allowed over the line without the necessity of applying and later removing guards.

It will be obvious to those skilled in the part that various changes may be made without departing from the scope of the invention and the invention is not to be considered limited to what is shown in the drawings and described in the specification.

I claim:
1. A reflective element comprising a flat upper and lower surface and vertical side walls, and a plurality of small reflective glass spheres having a diameter in the range of ½–50 mils partially embedded in the vertical side walls of said element and substantially covering its entire periphery, said upper flat surface being free of said glass spheres, the width of said flat surfaces being at least twice the height of said vertical side walls of the element.
2. A reflective element according to claim 1 wherein the element is in the shape of a circular disc having a diameter ¼″–4″ and a height of ⅛″–½″.
3. A reflective element according to claim 1 wherein the element has a width of not exceeding 1″ and a height of ⅛″–½″.
4. A reflective element according to claim 1 wherein the glass spheres have a refractive index of at least 1.9.
5. A reflective element according to claim 1 wherein the element has a cross sectional shape in the form of a polygon.
6. A reflective element according to claim 1 wherein the element is a solidified plastic material having the glass spheres partially embedded therein.
7. A reflective element according to claim 1 wherein the element is porous or provided with holes.
8. A reflective element according to claim 1 wherein the element has a rigid core and a coating on its vertical surfaces in which said glass spheres are embedded.
9. A reflective marker comprising a layer of a pigmented binder material having a plurality of reflective elements according to claim 1 at least partially embedded therein with one of their flat sides down whereby at least a portion of the upstanding vertical side walls of the elements are exposed and act as retroreflective surfaces for retroreflecting headlights at night.
10. A reflective marker according to claim 9 wherein said reflective elements are of a solidified plastic material having the glass spheres partially embedded therein and have a thickness of 1/8–1/2″ and a maximum distance across the upper surface of 1/4–4″.

References Cited

UNITED STATES PATENTS

| | | | |
|---|---|---|---|
| 1,560,354 | 11/1925 | Smith | 94—1.5 X |
| 2,079,260 | 5/1937 | Noderer | 94—1.5 |
| 2,345,644 | 4/1944 | Weber | 94—1.5 X |
| 3,030,870 | 4/1962 | Gill | 94—1.5 |
| 3,086,431 | 4/1963 | Perry | 94—1.5 X |
| 3,204,537 | 9/1965 | Searight | 94—1.5 |
| 3,240,132 | 3/1966 | Wiswell | 94—1.5 |
| 3,252,376 | 5/1966 | De Vries | 94—1.5 X |
| 3,274,888 | 9/1966 | Vanstrum | 94—1.5 X |

NILE C. BYERS, JR., *Primary Examiner.*

Dedication 3,418,896.—*Donald C. Rideout*, Huntingdon, Pa. REFLECTIVE MARKERS AND REFLECTIVE ELEMENTS THEREFOR. Patent dated Dec. 31, 1968. Dedication filed Apr. 13, 1976, by the assignee, *Prismo Universal Corporation*.

Hereby dedicates to the Public the entire term of said patent.

[*Official Gazette June 15, 1976.*]